Figure 1:
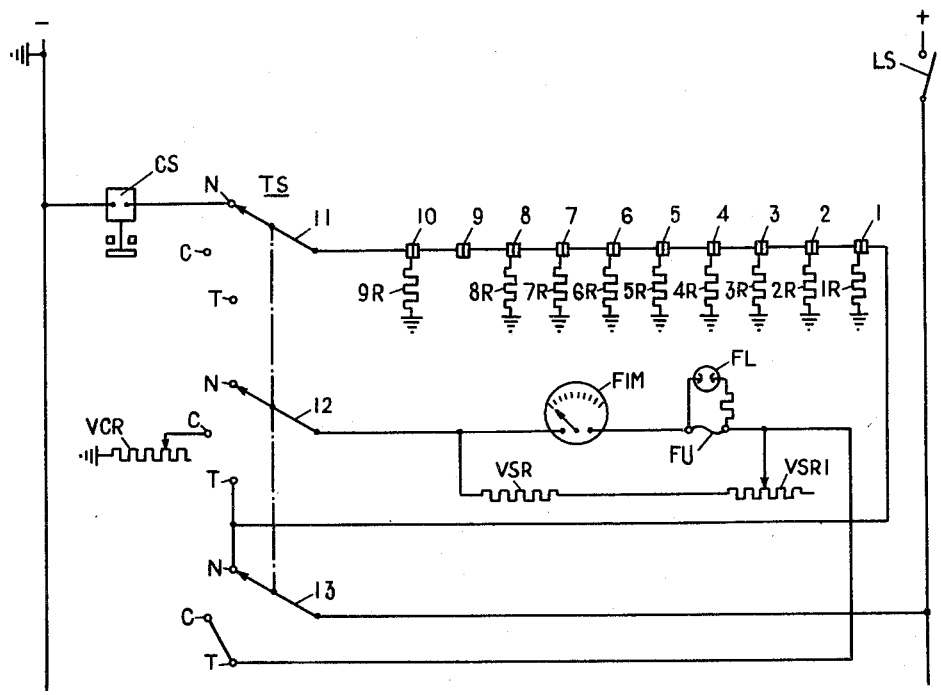

William Henry Bruns INVENTOR
BY Walter S. Bradley ATTORNEY

Patented Jan. 3, 1950

2,493,524

UNITED STATES PATENT OFFICE 2,493,524

APPARATUS FOR LOCATING OPEN CIRCUIT FAULTS IN ELECTRICAL CIRCUITS

William Henry Bruns, Lincolndale, N. Y., assignor to Otis Elevator Company, New York, N. Y., a corporation of New Jersey Application February 10, 1945, Serial No. 577,257

9 Claims. (Cl. 177—311)

The invention relates to apparatus for locating open circuit faults in electrical circuits.

Open circuit faults may occur in electrical circuits due to various causes and it is desirable to be able to readily locate such faults. In electrical control systems, there are circuits in which a plurality of pairs of contacts are arranged in series relationship, all of which must be closed for a certain condition of operation. In many instances, such pairs of contacts are located at widely different points in the installation for which the control system is provided, or at least some of them are relatively inaccessible. For example, in elevator control systems, contacts associated with the elevator doors are arranged in series relationship in the circuit for the coil of at least one electromagnetic switch to prevent the operation of the elevator car unless all these respective pairs of contacts are closed. Such contacts are located in the elevator hoistway at the various landings and on the car so that should a fault exist at one of them due say to failure of apparatus or negligence which prevents completion of the circuit, the location of this fault which involves checking each pair of contacts individually is a somewhat difficult and laborious procedure. A similar situation exists in the case of the contacts of the various safety devices of an elevator system which are arranged in series relationship in a control circuit. This is also true of control systems for moving stairways where the contacts of the various safety devices are arranged in series relationship in a control circuit.

One object of the invention is to provide apparatus for locating open circuit faults in electrical circuits which is of simple construction and reliable in operation.

Another object of the invention is to provide apparatus for locating open circuit faults in electrical circuits which can be readily and economically installed as part of the installation for which the electrical system is provided.

The invention involves the provision, for an electrical circuit in connection with which open circuit faults may occur, of a plurality of relatively high ohmic value impedances connected from a common connection to such points in said circuit that the number of impedances connected in parallel when testing for an open circuit fault is dependent upon the point in the circuit at which the fault exists, in conjunction with means for measuring the number of impedances in parallel. In carrying out the invention in accordance with the arrangement which will be described, which is illustrated as applied to a circuit having a plurality of pairs of contacts in series relationship therein with the points of connection thereto of said impedances such that the number of pairs of contacts between each pair of adjacent points is at least one, the circuit through the pairs of contacts and impedances to the common connection is connected to a source of current through an electrical measuring instrument with the measuring instrument calibrated to indicate the point in the circuit at which the fault exists.

Features and advantages of the invention will become apparent from the following description and appended claims.

Figure 2:
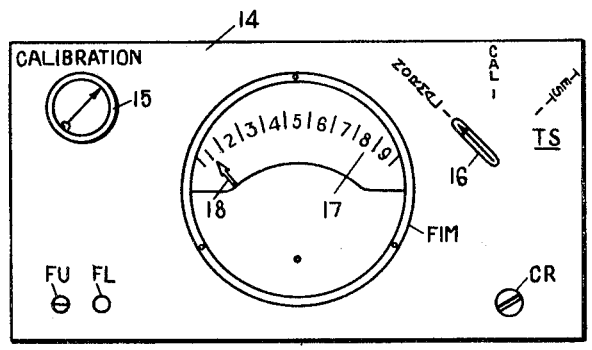

In the drawings:

Figure 1 is a schematic wiring diagram of a simple circuit having a plurality of pairs of contacts arranged in series relationship therein with fault locating apparatus embodying the invention applied thereto; and Figure 2 is a face view of the panel of a testing instrument embodying certain of the fault locating apparatus of Figure 1.

Referring to Figure 1, CS represents a control switch. A plurality of pairs of contacts designated 1, 2, 3, 4, 5, 6, 7, 8, 9 and 10 are connected in series relationship in the circuit for the coil of switch CS. In an elevator control system switch CS may be a switch which when deenergized prevents operation of the elevator while contacts 1 to 10 inclusive may be contacts of the various safety devices, such as, overspeed governor contacts, safety operated switch, slack cable switch, limit switches and the like, or contacts associated with the hoistway doors and car door or contacts of both safety devices and doors. These contacts may control the coils of several electromagnetic switches instead of one as shown and the various circuits of these coils may be open at other points. A similar situation exists in the case of moving stairways wherein the contacts may be overspeed governor contacts, overload contacts, broken chain switches, broken handrail switches and the like. A direct current source of supply is illustrated in which the supply lines are designated + and —. The — line is grounded. LS is a line switch for connecting the control circuit to the source of current. Control switch CS is illustrated in deenergized condition and each of the pairs of contacts 1 to 10 inclusive is illustrated as engaged.

In applying the invention to such control circuit according to the arrangement illustrated, a fault indicating meter FIM in the form of a milli-ammeter is utilized. A three position test switch TS is provided by means of which the normal connection of the contacts in series relationship with the coil switch CS may be effected, by means of which the fault indicating meter FIM may be connected in a calibrating position, and by means of which the meter may be connected in test position with respect to the contacts. The three positions of the test switch are designated N for the normal position, C for calibrating position and T for test position. This switch has three blades designated 11, 12 and 13, each of which is adapted to engage three contacts, one for each position of the switch. Accordingly, these contacts for each blade are designated N, C and T for normal, calibrating and test positions respectively.

The left hand contact of each pair of contacts or, in the case of testing certain pairs of contacts in a group, the left hand contact of the left hand pair of contacts of that group, is connected through an impedance to ground. These impedances are illustrated as resistances which are designated 1R, 2R, 3R, 4R, 5R, 6R, 7R, and 8R for contacts 1, 2, 3, 4, 5, 6, 7, and 8 respectively and 9R for contacts 9 and 10 which are tested as a group, as for example where they are contacts of a pair of overload switches in the circuit for a polyphase alternating current motor subject to the control of the control circuits. It is preferred to have the ohmic value of each of these resistances high enough to obviate appreciable power consumption yet not so high as to approximate the leakage resistance of the circuit. Also, it is desirable that each resistance be of a small size. Whatever value is chosen, it is preferred to have each resistance of the same ohmic value. Resistances, each of which is of an ohmic value of 100,000 ohms and of ½ watt size, have been found satisfactory for 110 volt circuits.

In normal position of the test switch in which the blades engage their respective contacts N, blade 13 connects the right hand contacts of the pair of contacts 1 to line +, while blade 11 connects the left hand contact of the pair of contacts 10 to the coil of switch CS. With the test switch in test position in which the blades engage their contacts T, the test resistances are connected in parallel through the contacts for which they are provided and the fault indicating meter FIM to the source. This circuit is from the line + through switch blade 13, fuse FU, meter FIM, switch blade 12, through all of resistances 1R to 9R inclusive in parallel assuming all contacts closed, through ground to line —, the contacts being disconnected from the coil of switch CS with switch blade 11 in test position. With the test switch in calibrating position in which the blades engage their contacts C, fault indicating meter FIM is connected in circuit with a compensating resistance VCR which is of a value corresponding to that of test resistances 1R to 9R inclusive in parallel. This circuit is from line + through switch blade 13, fuse FU, meter FIM, switch blade 12, resistance VCR and ground to line —. Calibrating resistances are provided for the meter, these resistances being in the form of a fixed resistor designated VSR and a variable resistor designated VSR1. FU is a protective fuse for the meter while FL is a glow lamp for indicating when the fuse is blown.

Each of the test resistances 1R to 9R inclusive may be installed as a part of the particular safety device or contact unit for which it is provided, as for example by locating it in the switch box provided for the contacts or as a part of the mounting unit for the contacts and connected to ground at that point. To enable the resistances to be readily so installed, it is of advantage that they be of small size. The rest of the fault indicating apparatus may be arranged as a unit in a box to form a test instrument which may be located at a convenient point, as for example at the control panel where the fault locating apparatus is provided for a control system for an elevator or moving stairway. A suitable panel arrangement for this instrucent is shown in Figure 2.

Referring to Figure 2, on the face of the panel 14 is a knob 15 with the word "Calibration" above. This is for varying calibrating resistance VSR1. There is also an operating knob 16 for test switch TS. The three positions of the test switch are designated Normal, Cal. and Test. The meter is provided with a dial 17 having a number of scalar units corresponding to the number of pairs of contacts to be tested. For convenience these units are numbered 1, 2, 3, 4, 5, 6, 7, 8 and 9, corresponding to the numbering of the contacts on the diagram. In practice, these units may be designated in accordance with the names of the contacts, as for example, LBC for the left hand broken chain switch of a moving stairway. The meter has a pointer 18 for indicating the numbers of the scalar units. The pointer and dial are enclosed by a glass face. The fuse and glow lamp which are mounted in the face of the panel for replacement purposes are respectively designated FU and FL as in the wiring diagram. CR is an aperture in the panel to admit a screw driver in order to vary the compensating resistance VCR.

When the fault locating apparatus has been installed, the meter FIM is first calibrated. The initial calibration is made with the test switch in position T. It having first been ascertained that each pair of contacts 1 to 10 inclusive is closed, the calibrating knob is turned to vary resistance VSR1 until the pointer 18 of the meter points at the middle of scalar unit 9. This calibrates the meter. The test switch is then moved to position C and resistance VCR is adjusted to cause pointer 18 to again register with scalar unit 9. This places the apparatus in condition for rechecking the calibration of the meter. The test switch is then moved to normal position for normal operation of the control system.

When a fault occurs in the circuit in which the contacts are arranged, the test switch is first thrown to position C to check the calibration of the meter. If the pointer does not point at the center of unit 9, as for example due to a value of applied voltage which is different from that at which the initial calibration was made, the calibrating resistance is varied to give the correct reading. Assuming the pointer registers with unit 9 on the meter scale, the test switch is then thrown to position T. The position of pointer 18 indicates the point in the circuit at which the open circuit exists. For example, assuming the open circuit at contacts 5, there will be only four resistances, namely 1R, 2R, 3R and 4R, connected in parallel in the meter circuit so that, all four resistances being of equal ohmic value, the pointer will register with unit 5 on the meter scale, four units above zero current position 1. In other words, the meter pointer registers with the scalar unit corresponding with the first from the left of the contacts 1 to 10 inclusive at which a fault exists. With the point at which the fault exists indicated, the fault is corrected. A test is again made and if the pointer registers with unit 9, the circuit is again ready for normal operation. If a second fault exists in the circuit to the left of the first, this will now be indicated on the meter. When all faults have been corrected and a reading of 9 is had on the meter, the test switch is thrown back to position N for normal operation of the system.

If desired, the circuit in which the contacts are connected may be tested in sections embodying two or more contacts in a section, as for example in the case of door contacts of an elevator installation of a considerable number of floors.

Thus it is seen that the open circuit fault locating apparatus is of simple construction and readily locates a fault in the circuit. Also it is simple and economical to install.

While the fault finding apparatus has been described as applied to a system with direct current supply lines, it is also applicable to alternating current supply lines. It is desirable to utilize a direct current meter and for an alternating current supply, this may be provided by a rectifier in series with the meter with another rectifier in a circuit by passing the meter and first rectifier and connected to pass current in the opposite direction. Where there is no ground in the system, current may be provided for testing as for example in an alternating current system by a transformer, the secondary of which is connected in series with the meter, with the throwover switches connected to effect the changeover. In some instances a return wire may be employed instead of ground.

Where the value of the voltage utilized for testing is of substantially constant value, the calibration circuits including resistance VCR may be omitted and the initial calibration of the meter relied on. Other arrangements for measuring the number of impedances in parallel may be employed, as for example a Wheatstone bridge circuit in which the impedances are in one leg of the bridge and a variable impedance is utilized in another leg to balance the parallel impedances, with balance shown by any suitable device such as a magic eye. The amount of variable impedance to effect the balance would indicate the point of fault. In some circuit arrangements the impedance measuring circuits may be connected in at all times.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for locating open circuit faults in an electric circuit in which a plurality of pairs of contacts are arranged in series relationship comprising; a plurality of impedances connected from a common connection respectively to spaced points in said circuit, there being at least one pair of contacts between each pair of adjacent points; and impedance measuring means connected in a test circuit extending through said first named circuit and said impedances in parallel on one side of the open circuit fault and through said common connection to provide a measure which indicates the location of said fault.

2. Apparatus for locating open circuit faults in an electrical circuit in which a plurality of pairs of contacts are arranged in series relationship and which is adapted for connection across supply lines comprising; a plurality of impedances, each impedance being connected at one end to a different one of a plurality of spaced points in said circuit, the other ends of said impedances being connected together, and there being at least one pair of said contacts between each pair of adjacent points impedance measuring means; and means for disconnecting said circuit from across said supply lines and for connecting said impedance measuring means in a test circuit extending by way of said contacts in a certain direction in said first named circuit to a point at which an open circuit fault exists and through said impedances in parallel which are connected to said first named circuit up to such point to provide an indication on said impedance measuring means of the location of said point of fault.

3. Apparatus for locating an open point in an electrical circuit in which a plurality of pairs of contacts are arranged in series relationship comprising; a plurality of impedances which are respectively connected from a common connection to such points in said circuit that in a certain direction in said circuit there is at least one pair of said contacts up to said first such point and between each such point and the next; impedance measuring means; and means for connecting said impedance measuring means in a test circuit through all of said contacts in said certain direction in said circuit containing said contacts to an open point therein and through all of said impedances to such open point in parallel, by way of said common connection back to said impedance measuring means, said impedance measuring means being adapted to measure the total impedance of such impedances connected in parallel to such open point for indicating such point.

4. Apparatus for locating open circuit faults in an electrical circuit in which a plurality of pairs of contacts are arranged in series relationship, which circuit is adapted for connection across supply lines having a connection to ground, and which circuit has an electroresponsive device therein between said contacts and one of said supply lines, comprising; a plurality of impedances connected from ground respectively to different ones of said pairs of contacts on the side thereof of said one supply line; an impedance measuring device; and means for opening said circuit at a point between said contacts and said one supply line and for connecting said impedance measuring device in a test circuit from the other supply line by way of said first named circuit through said contacts and extending therefrom through said impedances in parallel to ground whereby, when a fault exists in said first named circuit, the location of said fault determines the number of impedances in parallel in said test circuit and thus the measurement obtained by said measuring device, thereby indicating said point of fault.

5. Apparatus for locating open circuit faults in an electrical circuit in which a plurality of pairs of contacts are arranged in series relationship, which circuit is adapted for connection across direct current supply lines the negative side of which is grounded, and which circuit has an electroresponsive device therein on the negative side of said contacts, comprising; a plurality of resistances, one for each pair of contacts, connected respectively from ground to the pairs of contacts for which the resistances are provided on the negative side of the contacts in said circuit; a direct current ammeter; and means for disconnecting said circuit from said negative side of said supply lines and for connecting said meter between the positive side of said supply lines and said contacts for indicating, when an open circuit fault exists in said circuit, the number of said resistances connected in parallel between the positive side of said supply lines and the fault and thus the point in said circuit at which such fault exists.

6. Apparatus for locating open circuit faults in an electrical circuit in which a plurality of pairs of contacts are arranged in series relationship and which is adapted for connection across direct current supply lines the negative side of which is grounded comprising; a plurality of resistances, one for each pair of contacts, connected respectively from ground to the pairs of contacts for which the resistances are provided on the negative side of the contacts in said circuit; and a direct current ammeter connected between the positive side of said supply lines and said contacts for indicating, when a fault exists in said circuit, the number of said resistances connected in parallel and thus the point in said circuit at which such fault exists.

7. Apparatus for locating open circuit faults in an electrical circuit in which a plurality of pairs of contacts are arranged in series relationship and which is adapted for connection across direct current supply lines the negative side of which is grounded comprising; a plurality of resistances, one for each pair of contacts, connected respectively from ground to the pairs of contacts for which the resistances are provided on the negative side of the contacts in said circuit; a direct current ammeter; and a switch operable to disconnect said circuit through said contacts from said supply lines and to complete a testing circuit from the positive side of said supply lines through said ammeter and those of said resistances in parallel, by way of said contacts up to a point where an open circuit exists, to ground.

8. Apparatus for locating open circuit faults in an electrical circuit in which a plurality of pairs of contacts are arranged in series relationship and which is adapted for connection across direct current supply lines the negative side of which is grounded comprising; a plurality of test resistances, one for each pair of contacts, connected respectively from ground to the pairs of contacts for which the resistances are provided on the negative side of the contacts in said circuit; a direct current ammeter; a variable resistance connected in parallel with said ammeter for calibrating said ammeter; and a plural position test switch operable in one position to establish the connection of said circuit through said contacts across said supply lines for normal operation, and in another position to disconnect said circuit through said contacts from said supply lines and to complete a testing circuit from the positive side of said supply lines through said ammeter and calibrating resistance in parallel to the end of said circuit through said contacts which was connected to the positive side of said supply lines with said switch in said one position, through those of said test resistances in parallel by way of said contacts up to a point where an open circuit exists, and ground to the negative side of said supply lines, to indicate the point at which said open circuit exists.

9. Apparatus for locating open circuit faults in an electrical circuit in which a plurality of pairs of contacts are arranged in series relationship, which is adapted for connection across direct current supply lines the negative side of which is grounded, and which has an electroresponsive device therein on the negative side of said contacts comprising; a plurality of test resistances, one for each pair of contacts, connected respectively from ground to the pairs of contacts for which the resistances are provided on the negative side of the contacts in said circuit; a direct current ammeter; a calibrating resistance for said ammeter connected in parallel therewith; a compensating resistance having one end connected to ground and adjustable to a value equal to that of all of said test resistances in parallel; and a three position three blade test switch operable in one position to establish the connection of said circuit through said electroresponsive device and said contacts across said supply lines for normal operation, in a second position to disconnect the portion of said circuit through said contacts from said supply lines and to complete a calibration checking circuit from the positive side of said supply lines through said ammeter and calibrating resistance in parallel, said compensating resistance and ground to the negative side of said supply lines, and in a third position to disconnect said portion of said circuit through said contacts from said supply lines and to complete a testing circuit from the positive side of said supply lines through said ammeter and calibrating resistance in parallel to the end of said circuit through said contacts which was connected to the positive side of said supply lines with said switch in said one position, through those of said test resistances in parallel by way of said contacts up to a point where an open circuit exists, and ground to the negative side of said supply lines to indicate the point at which said open circuit exists.

WILLIAM HENRY BRUNS.

REFERENCES CITED

The following references are of record in the file of this patent:

UNITED STATES PATENTS

| Number | Name | Date |
|---|---|---|
| 826,090 | Doran | July 17, 1906 |
| 880,136 | Gehrung | Feb. 25, 1908 |
| 1,397,641 | Kolff | Nov. 22, 1921 |
| 1,655,465 | Huber | Jan. 10, 1928 |

FOREIGN PATENTS

| Number | Country | Date |
|---|---|---|
| 23,439 of 1895 | Great Britain | Feb. 15, 1896 |
| 214,117 | Germany | Oct. 2, 1909 |

OTHER REFERENCES

Laws, Electrical Measurements, McGraw-Hill, New York, 1917, pp. 690–693.